United States Patent
Gao et al.

(10) Patent No.: US 9,432,642 B2
(45) Date of Patent: Aug. 30, 2016

(54) IMAGING SYSTEM AND METHOD HAVING EXTENDED DEPTH OF FIELD

(75) Inventors: Lu Gao, San Jose, CA (US); Jizhang Shan, Cupertino, CA (US); Guansong Liu, San Jose, CA (US); Hongjun Li, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 253 days.

(21) Appl. No.: 13/323,394

(22) Filed: Dec. 12, 2011

(65) Prior Publication Data

US 2013/0147994 A1 Jun. 13, 2013

(51) Int. Cl.
*H04N 9/04* (2006.01)
*H04N 5/232* (2006.01)

(52) U.S. Cl.
CPC .......... *H04N 9/045* (2013.01); *H04N 5/23212* (2013.01); *Y10T 29/49826* (2015.01)

(58) Field of Classification Search
USPC ........ 348/266, 272–275, 280–283, 294, 335, 348/336, 340, 222.1
See application file for complete search history.

(56) References Cited

U.S. PATENT DOCUMENTS

| | | | |
|---|---|---|---|
| 4,808,501 A * | 2/1989 | Chiulli ............................. | 430/7 |
| 5,096,801 A | 3/1992 | Koya et al. | |
| 5,547,369 A * | 8/1996 | Sohma et al. ................. | 431/75 |
| 5,748,371 A | 5/1998 | Cathey, Jr. et al. | |
| 6,711,302 B1 | 3/2004 | Lee | |
| 7,218,448 B1 | 5/2007 | Cathey, Jr. et al. | |
| 7,260,251 B2 | 8/2007 | Dowski, Jr. et al. | |
| 7,379,613 B2 | 5/2008 | Dowski, Jr. et al. | |
| 7,436,595 B2 | 10/2008 | Cathey, Jr. et al. | |
| 7,751,619 B2 | 7/2010 | Kawanishi et al. | |
| 2005/0259162 A1 | 11/2005 | Shan | |
| 2005/0259886 A1 | 11/2005 | Shan | |
| 2006/0071156 A1 * | 4/2006 | Masaki ............. | H01L 27/14621 250/226 |
| 2006/0204861 A1 | 9/2006 | Ben-Eliezer et al. | |
| 2009/0213321 A1 | 8/2009 | Galstian et al. | |
| 2009/0316097 A1 | 12/2009 | Presniakov et al. | |

(Continued)

FOREIGN PATENT DOCUMENTS

| | | |
|---|---|---|
| CN | 101867830 A | 10/2010 |
| TW | 201143357 A | 12/2011 |

OTHER PUBLICATIONS

Notice of Allowance issued in U.S. Appl. No. 13/179,488 dated Feb. 5, 2013, 8 pages.

(Continued)

*Primary Examiner* — Mark Monk
(74) *Attorney, Agent, or Firm* — Lathrop & Gage LLP

(57) ABSTRACT

An imaging system and method having a selected depth of field include an imaging lens for forming images of an object, the imaging lens having chromatic aberration and a color image sensor for receiving the images of the object. The color image sensor has a selected spectral response, the selected spectral response of the color image sensor defining a selected first center wavelength, a selected second center wavelength and a selected third center wavelength, wherein the selected first center wavelength is larger than the selected second center wavelength and the selected second center wavelength is larger than the selected third center wavelength. The selected spectral response defines the depth of field of the imaging system. A difference between the selected first center wavelength and the selected third center wavelength is greater than 150 nm.

16 Claims, 7 Drawing Sheets

(56) References Cited

U.S. PATENT DOCUMENTS

2010/0007807 A1    1/2010   Galstian et al.
2010/0157127 A1*   6/2010   Takayanagi et al. .... 348/333.02
2010/0265352 A1*  10/2010   Nashizawa ................ 348/222.1

OTHER PUBLICATIONS

File History of U.S. Appl. No. 13/179,488; Title of Intention: Cross-Color Processing Systems and Methods for Sharpness Enhancement; filed Jul. 9, 2011.

File History of U.S. Appl. No. 13/149,707; Title of Invention: System and Method for Extending Depth of Filed in a Lens System by use of Color-Dependent Wavefront Coding; filed May 31, 2011.

"Wiener Restoration of Sampled Image Data: End-to-End Analysis", by Carl L. Fales, et al., J. Opt. Soc. Am. A/vol. 5, No. 3, pp. 300-314, Mar. 1988.

"Extended Depth of Field Through Wave-Front Coding", by Edward R. Dowski, Jr., et al., Applied Optics, vol. 34, No. 11, pp. 1859-1866, Apr. 10, 1995.

"New Paradigm for Imaging Systems", by W. Thomas Cathey et al., Applied Optics, vol. 41, No. 29, pp. 6080-6092, Oct. 10, 2002.

"Spectral Focal Sweep: Extended Depth of Field from Chromatic Aberrations", by O. Cossairt, et al., IEEE International Conference on Computational Photography (ICCP), Mar. 2010.

"Extended Depth-of-Field (EDoF) Using Sharpness Transport Across Colour Channels", by Christel-Loic Tisse, et al., 2008.

Notice of Allowance issued in U.S. Appl. No. 13/149,707 dated Feb. 5, 2013, 14 pages.

Taiwanese Patent Application 101143158 Office Action dated Jul. 8, 2015, with Concise Explanation of Relevance, 7 pages.

Chinese Patent Application 201210528671.6 Office Action dated Nov. 17, 2015, with English Translation, 12 pages.

* cited by examiner

IMAGING SYSTEM AND METHOD HAVING EXTENDED DEPTH OF FIELD

BACKGROUND

This disclosure relates to imaging systems and methods, and, in particular, to imaging systems and methods in which the depth or field (DOF) is extended or increased.

The depth of field (DOF) of an imaging system is the range of distance in which an object can be positioned with respect to the imaging system such that an image of the object is sharply focused. Depth of focus refers to a range of distances that a detector can be from the imaging optics, such that an object at a given distance is sharply focused. Therefore a range of depth of focus can be considered to map to a corresponding depth of field. A typical optical imaging system has a limited DOF. When the imaging system captures optical data, i.e., takes a picture, only objects within the depth of field will have sharp images in the picture. The adjustment of the system to produce a sharp image of an object at a particular distance from the imaging lens is commonly known as "focusing." It is desirable to extend the DOF of imaging systems such that images of objects having varying distances appear sharp in the picture. Extended DOF thus allows a photographer to be less concerned about focusing on a particular object.

SUMMARY

According to one aspect, the present disclosure is directed to an imaging system having a selected depth of field. The imaging system includes an imaging lens for forming images of an object, the imaging lens having chromatic aberration. A color image sensor receives the images of the object. The color image sensor has a selected spectral response, the selected spectral response of the color image sensor defining a selected first center wavelength, a selected second center wavelength and a selected third center wavelength, wherein the selected first center wavelength is larger than the selected second center wavelength and the selected second center wavelength is larger than the selected third center wavelength. The selected spectral response defines the depth of field of the imaging system. A difference between the selected first center wavelength and the selected third center wavelength is greater than 150 nm.

According to another aspect, the present disclosure is directed to a method of controlling depth of field in an imaging system, the method comprising: providing an imaging lens with chromatic aberration for forming images of an object; and receiving the images of the object at a color image sensor, the color image sensor having a selected spectral response, the selected spectral response defining a selected first center wavelength, a selected second center wavelength and a selected third center wavelength, wherein the selected first center wavelength is larger than the selected second center wavelength and the selected second center wavelength is larger than the selected third center wavelength, the selected spectral response defining a selected depth of field of the imaging system. A difference between the selected first center wavelength and the selected third center wavelength is greater than 150 nm.

According to another aspect, the present disclosure is directed to an imaging system. The imaging system includes an imaging lens having chromatic aberration for forming color images of an object, and a color image sensor having a spectral response for detecting images of a first center wavelength, a second center wavelength, and a third center wavelength of the object formed by the imaging lens. The spectral response of the color image sensor determines the first, second, and third center wavelengths, the first center wavelength is larger than the second center wavelength and the second center wavelength is larger than the third center wavelength, and the difference of the first and third center wavelengths is larger than 150 nm. The imaging system has a first through focus curve having a first peak of the first center wavelength, a second through focus curve having a second peak of the second center wavelength, and a third through focus curve having a third peak of the third center wavelength, and wherein at least one of the through focus curves covers any position in a domain spanned from the first peak to the third peak. The imaging system also includes a digital image processor that processes the detected images of the first, second, and third center wavelengths, restores the images of the first, second, and third center wavelengths, and produces sharp images of the first, second, and third center wavelengths.

According to another aspect, the present disclosure is directed to a method of making an imaging system having a desired depth of field. The method includes: selecting the desired depth of field for the imaging system; selecting an imaging optical element having chromatic aberration; selecting an image sensor; selecting a spectral response for an array of color filters of the image sensor, the spectral response of the array of filters being based on the selected desired depth of field; and providing the imaging system with the array of color filters having the selected spectral response such that the imaging system has the selected desired depth of field.

BRIEF DESCRIPTION OF THE DRAWINGS

The foregoing and other features and advantages of the disclosure will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION

Figure 1:
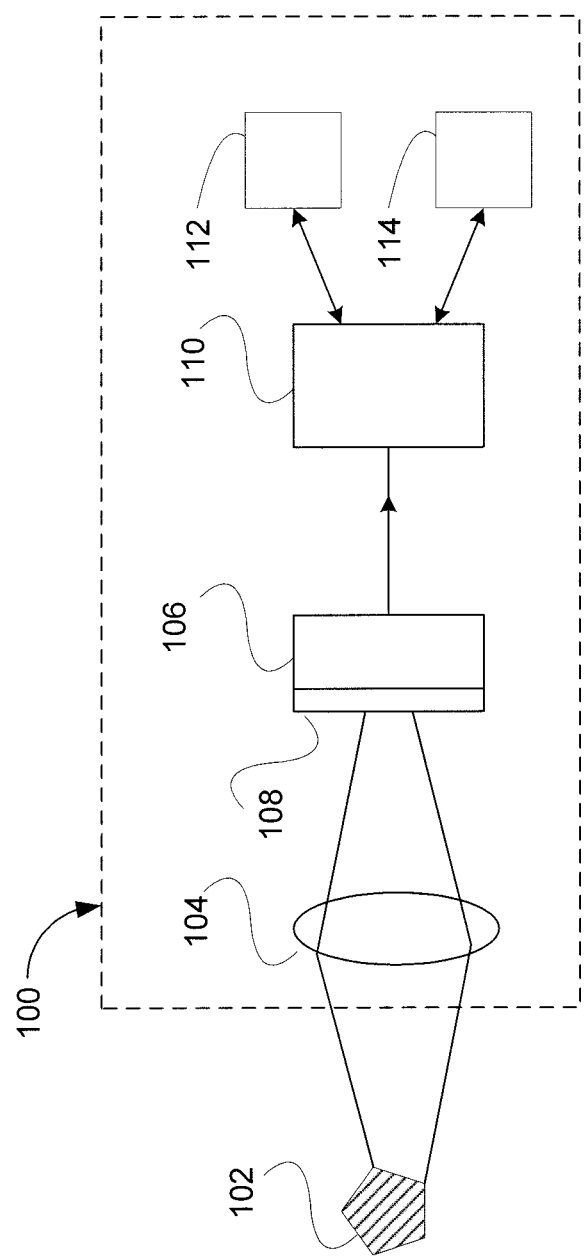
FIG. 1 contains a schematic block diagram of an imaging system used to form an image, i.e., take a picture, of an object.

Various approaches to extending the DOF of imaging systems have been proposed. For example, digital restoration methods can be applied to captured image data to extend the DOF of the system. One such digital restoration approach involves the restoration of blurred images caused by chromatic aberration, as described in copending U.S. patent application Ser. No. 13/179,488, filed on Jul. 9, 2011, entitled, "Cross-Color Image Processing Systems and Methods for Sharpness Enhancement," of common inventors and common assignee to the present application, referred to hereinafter as "the '488 patent application." The '488 patent application is incorporated herein in its entirety by reference.

A lens with chromatic aberration, also referred to herein as a "chromatic lens," has different focal lengths for different colors. That is, the focal length of the chromatic lens varies with the wavelength of the light. A color image sensor has a color filter array which typically includes three sets of color filters to produce three color images. The three colors are commonly red, green and blue, but other colors may also be used. Throughout this disclosure, the colors are referred to as red, green and blue for the purpose of simplifying the disclosure. It should be noted that the use of red, green and blue is exemplary only. The disclosure is applicable to any combination of colors.

In the case of an imaging lens with chromatic aberration, the red, green and blue focal lengths are different. As a result, a red object may have a sharp detected image, while a green object and a blue object may not have sharp detected images. In a practical sense, in a typical natural scene, an object normally contains all three color components, which are generally different in magnitude. The combination of the different magnitudes of the three colors forms all of the colors occurring in the natural object. Thus, according to the above example, the detected red image component of the object may be sharp, while the detected green and blue image components of the object may not be sharp, i.e., they may be blurred.

Some digital image restoration approaches may restore the detected blurred image components when a detected image component is sharp. Such an approach is generally known as unsharp masking for image sharpening. Thus, for an object at a first distance having a sharp red image component and blurred green and blue image components, for example, all image components can be restored to sharp images. Similarly, for another object at a second distance having a sharp blue image component and blurred red and green image components, all image components can be restored to corresponding sharp images.

Thus, sharp color images of an object at a first distance and another object at a second distance can be produced by the digital image processing, e.g., image restoration. Based on the digital image processing, the depth of field of the imaging system is extended to cover the first object at the first distance and the second object at the second distance. That is, the chromatic imaging lens and the digital image processing effectively extend the depth of field of the optical imaging system.

FIG. 1 contains a schematic block diagram of an imaging system 100 used to forms an image, i.e., take a picture, of an object 102. Referring to FIG. 1, the imaging system 100 includes an imaging optical element 104, which forms the image of the object 102 at a color image sensor 106. The imaging optical element 104 may be a simple lens, a compound lens, a specially designed lens including a lens having artificially excessive chromatic aberration, a diffractive optical element (DOE), combinations thereof, or any structure that optically forms an image of an object. For simplicity of the present disclosure, the imaging optical element 104 will be referred to herein as a lens; however, it will be understood that the disclosure is applicable to other types of imaging optical elements, as noted above.

The color image sensor 106 includes a color filter array 108, which has three sets of color filters, for example, red, green and blue sets of filters, or sets of filters of other colors. In some exemplary embodiments, these colors may be within the visible light spectrum. The color image sensor 106 detects light intensity and converts it into electrical signals representing detected color intensity values. The color image sensor 106 may be, for example, a CMOS image sensor formed as an array of detector elements. Each detector element provides a color intensity value corresponding to the light intensity at a particular location within an image formed by the lens 104. The set of color intensity values for all three colors at a given location within the image is referred to as a "pixel," and the combination of all pixels is referred to as a "composite image." The color image sensor 106 detects images of the corresponding three color components, e.g., red, green, and blue, or other colors.

The object 102 may have, and, in general, will have, all three color components, although they may not be equal in magnitude. The image sensor 106 detects red, green and blue images of object 102. If the lens 104 were achromatic, all three color images of object 102 would have the same sharpness. However, if the lens 104 has chromatic aberration, as in accordance with the present disclosure, the detected three color images of object 102 will have different sharpness.

The imaging system 100 also includes a digital image processor 110. The digital image processor 110 processes the detected color images, e.g., red, green, and blue images, of object 102 to produce sharp restored color images, e.g., red, green, and blue images, of object 102. The processing used to produce the sharp restored color images may be of the type described in the '488 patent application, incorporated herein by reference above, or some other type of processing used to restore sharp color images. An optional display 112 may display the processed composite color image. The processed composite color image may also be stored in an optional storage unit 114, which may include some type of electronic memory.

Figure 2:
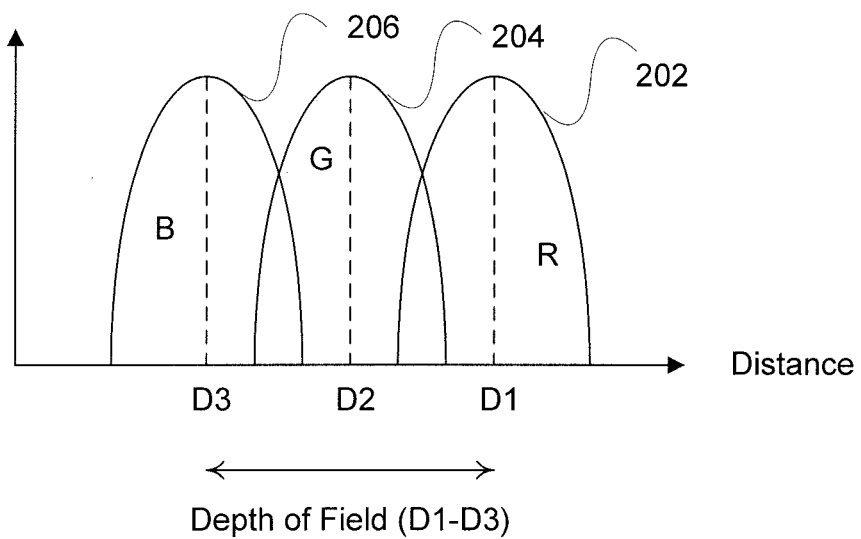
FIG. 2 contains a through focus graph representing performance of a chromatic imaging system.

FIG. 2 contains a through focus graph 200 of a chromatic imaging system. Referring to FIG. 2, the through focus graph 200 includes a red through focus curve 202, a green through focus curve 204 and a blue through focus curve 206. The abscissa or x-axis represents the distance of object 102 from the imaging lens 104. The ordinate or y-axis represents the image sharpness of the color components. The red focal length of a chromatic lens is normally larger than the green focal length, which is normally larger than the blue focal length, due to the relative wavelengths of the colored light, that is, $\lambda_R > \lambda_G > \lambda_B$, where $\lambda_R$, $\lambda_G$, $\lambda_B$ are red, green, and blue wavelengths, respectively.

When an object 102 is positioned at a distance D1, which is the location of the peak of the red through focus curve 202, its red image component is sharp, while its green and blue image components are blurred. Similarly, when the object 102 is positioned at distance D2, which is the location of the peak of the green through focus curve 204, its green image component is sharp, while its red and blue image components are blurred. Similarly, when the object 102 is positioned at distance D3, which is the location of the peak of the blue through focus curve 206, its blue image component is sharp, while its red and green image components are blurred.

As noted above, the peak of the red through focus curve 202 is located at distance D1, the peak of the green through focus curve 204 is located at distance D2, and the peak of the blue through focus curve 206 is located at distance D3. In the chromatic system of the disclosure, D1>D2>D3. It should be noted that in a purely achromatic system, D1=D2=D3. Accordingly, the red image of a far object located at distance D1 will be sharply formed, while the green and blue images will be blurred. Similarly, the blue image of a near object located at closer distance, i.e., distance D3, will be sharply formed, while the green and red images will be blurred. By performing the digital image processing restoration in the processor 110, all color images can be restored. That is, all sharp color images of the far object and all sharp color images of the near object can be produced. Thus, the far object and the near object can both be sharply focused.

In general, when processing such as discussed above is employed, depth of focus of the system 100 relates to the distance between the locations of the peaks of red through focus curve 202 and the blue through focus curve 206, that is, depth of focus relates to D1-D3. Other factors may also influence the width of curves 202, 204 and 206 and therefore also affect depth of focus. However, because a sharp image can be obtained by processing as long as one of the colors is in sharp focus, the range of distances across which at least two colors are in focus can be considered to add to the depth of focus that would otherwise occur. Thus, when such other factors remain constant, D1-D3 may be increased to increase depth of focus. As discussed above, when depth of focus increases, depth of field increases correspondingly.

The distances D1, D2, and D3 are determined by the red, green, and blue center wavelengths of the image sensor. The center wavelengths are, in turn, determined by the image sensor spectral response, which is the combined response of each color filter sensitivity and the sensor sensitivity. There is practically no standard of color filter sensitivity. The color filter sensitivity is device dependent. Depending on the manufacturer, color filter sensitivities of image sensors vary, because different materials and/or methods are used by different manufacturers for the same color filter. In some exemplary embodiments, the center wavelengths may be in the visible light spectrum.

Figure 6:
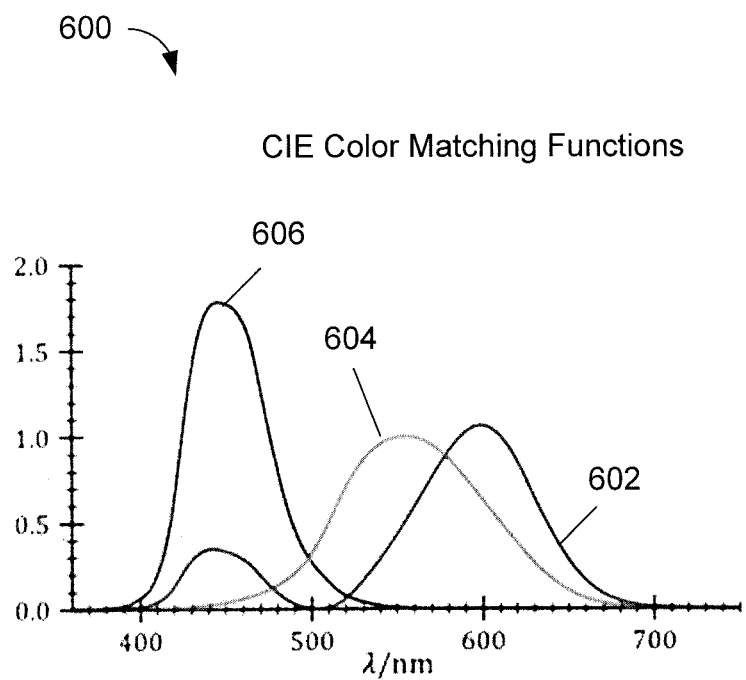
FIG. 6 illustrates CIE color matching functions for analyzing the color of an incident light.

FIG. 6 is a graph of color matching functions of the International Committee on Illumination (CIE). Although there is no standard, color filter sensitivities of image sensors generally approach the set 600 of theoretical color matching functions of the CIE shown in FIG. 6. As shown in FIG. 6, a red color matching function 602 has a peak at about 600 nm, a green color matching function has a peak at about 550 nm, and a blue matching function has a peak at about 450 nm. By neglecting the side lobe of red color matching function 602, the center wavelength of red matching function 602 is about 600 nm. The center wavelengths of green 604 and blue 606 matching functions are about 550 nm and 450 nm, respectively.

Following the CIE method, the color of an incident light having spectral power distribution I(λ) can be analyzed by taking the integration of I(λ) multiplying each color matching function. The three resulting values from the integration will determine the color of the incident light in the CIE chromaticity diagram and color space. The integration of I(λ) multiplying a color matching function is equivalent to passing the light of I(λ) through a color filter having a sensitivity of the color matching function, and summing the passing light.

Figure 3:
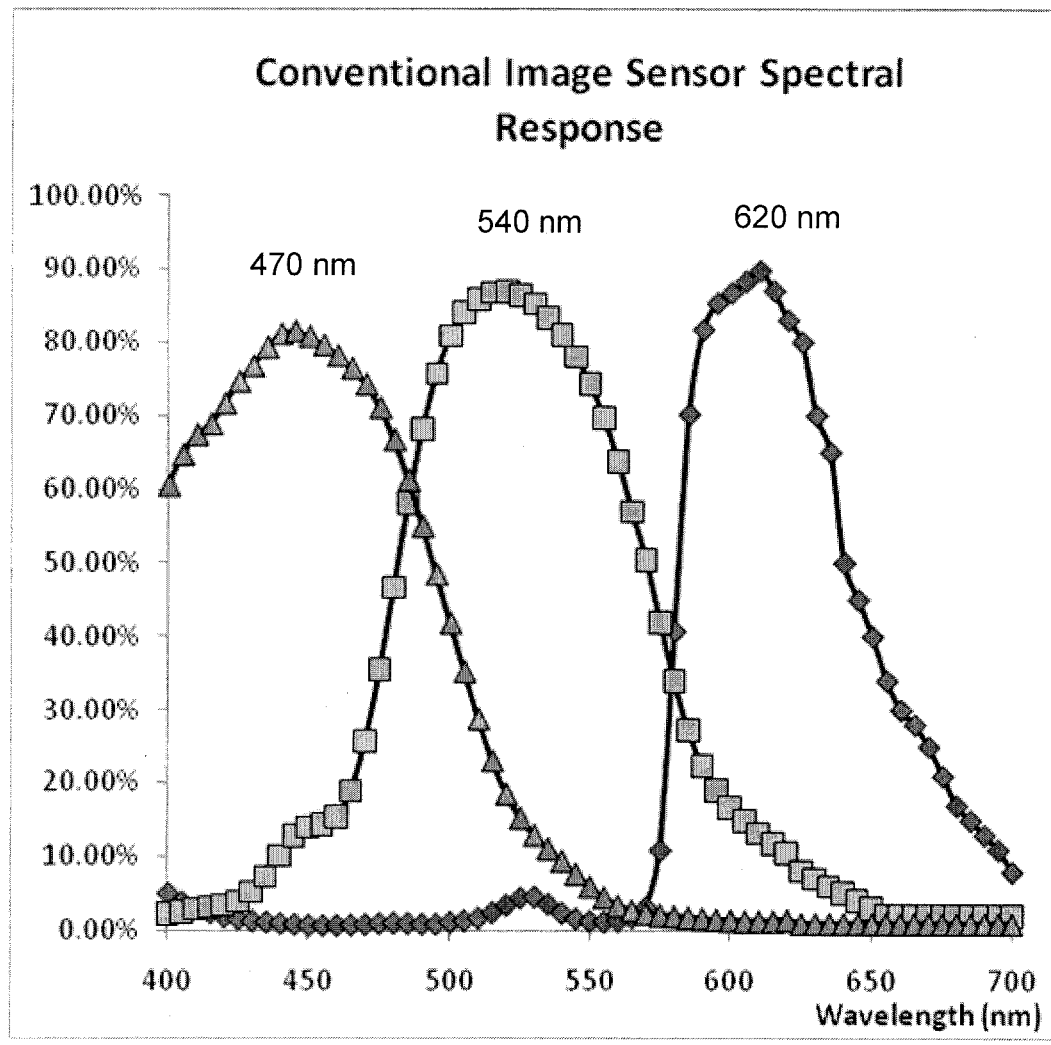
FIG. 3 is a graph of an example of a measured conventional image sensor spectral response.

FIG. 3 is a graph of an example of the measured spectral response of a typical image sensor. Referring to FIG. 3, the graph illustrates red, green, and blue responses having center wavelengths of 620 nm, 540 nm, and 470 nm, respectively. The locations D1, D2, D3 of the peaks of through focus curves 202, 204, 206, respectively, depend on the center wavelengths of the individual color response, e.g., 620 nm, 540 nm, 470 nm, respectively.

According to the present disclosure, to extend the depth of field, depth of focus can be increased by altering the wavelengths associated with through focus curves 202 and 206. That is, D1-D3 (as shown in FIG. 2) of the optical imaging system 100, which includes the chromatic imaging lens 104 and the digital processor 110 that processes the detected color image components to produce sharp images, may be increased. According to some exemplary embodiments, the selection or adjustment or alteration of the image sensor spectral response may be obtained by selecting or adjusting or altering the composition of ingredients in the material of the color filters in the color filter array 108.

The color filters in the color filter array 108 are commonly formed using a material such as transparent photoresist materials, which contain color pigments or dyes. The compositions of these color pigments or dyes are specifically chosen for the filter being produced. For example, a red filter of the color filter array 108 would have a different composition of pigments and dyes than a blue filter would have. According to the present disclosure, by properly selecting or adjusting or altering the composition of ingredients, e.g., pigments and/or dyes, in the materials of one or more color filters in the color filter array, an improved image sensor spectral response may be obtained. This also includes selecting a proper color filter or filters that would meet the requirement to extend D1-D3 as described above. For example, materials used and methods for manufacturing color filters are disclosed in U.S. Pat. No. 4,808,501 to Chiulli and U.S. Pat. No. 5,096,801 to Koya et al. The entire contents of both of these U.S. patents are incorporated herein by reference.

Figure 4:
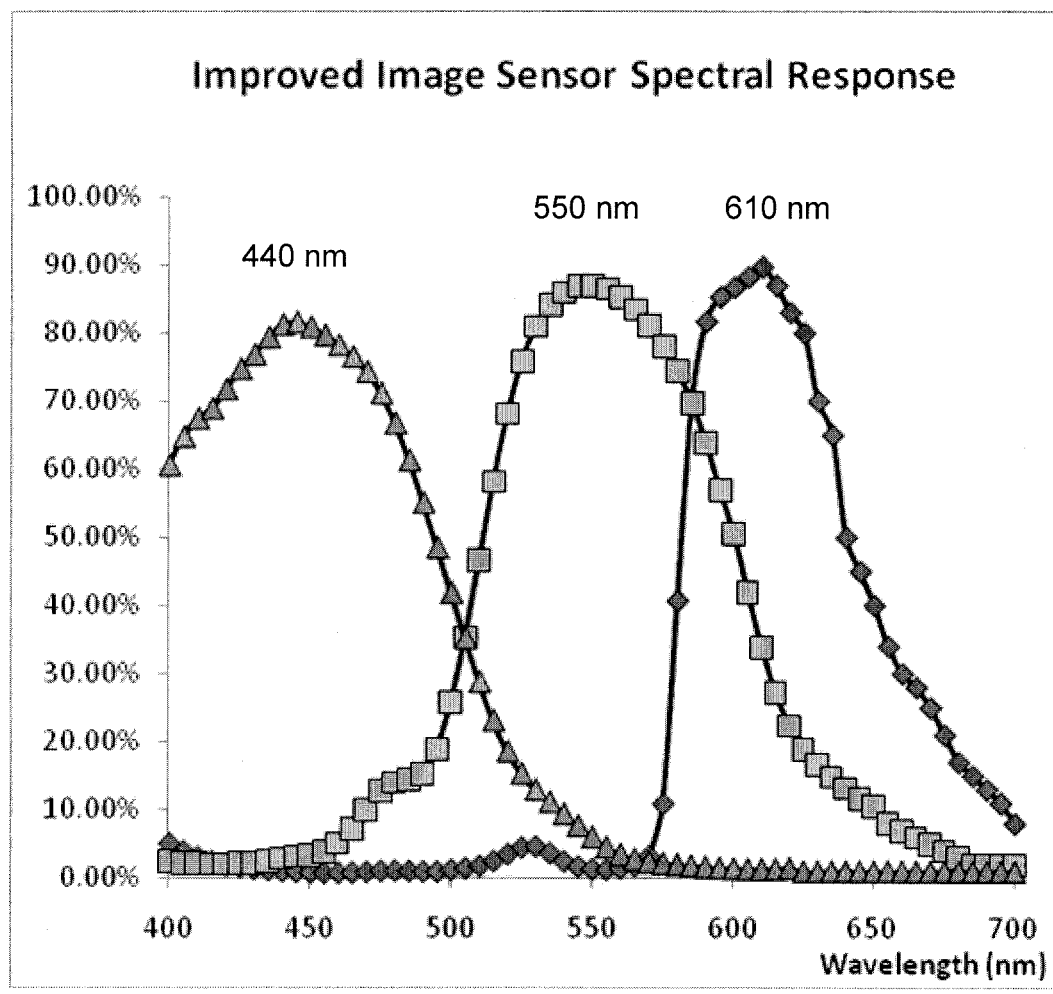
FIG. 4 is a graph of an example of a measured improved image sensor spectral response, obtained by adjusting the composition of one or more filters in the color filter array, according to exemplary embodiments.

FIG. 4 is a graph of an example of a measured improved image sensor spectral response, obtained by selecting or altering or adjusting the composition of one or more filters in the color filter array 108, according to exemplary embodiments. Specifically, in the example of FIG. 4, all three color filters, i.e., red, green, and blue, have had their material compositions selected such that their center wavelengths have changed. If should be noted that the response of FIG. 4 is exemplary only, and that, in general, it is not necessary to adjust the filter material compositions for all three color filters. Specifically, referring to the exemplary altered spectral response illustrated in FIG. 4, the center of the red response have moved from 620 nm to 610 nm, the center of the green response has moved from 540 nm to 550 nm; and the center of the blue response has moved from 470 nm to 440 nm. It is understood that other color filters, i.e., using different materials, having similar responses as that illustrated in FIG. 4 can be used as well without specifically altering color filters illustrated in FIG. 3.

Thus, according to the disclosure, as a result of this adjustment or alteration in the spectral response of the color image sensor 106 by adjusting or altering the composition of materials in the color filters of the color filter array 108, the depth of focus of the system 100 is extended, which accordingly extends depth of field. Specifically, the distance between the peaks of the red through focus curve and the blue focus curve are extended. The new, improved, adjusted, extended depth of field is larger than the original depth of field when conventional filters are used. That is, (D1'-D3')>(D1-D3), where D1' is the location of the new, adjusted red through focus curve peak for the adjusted 610 nm red center wavelength, and D3' is the location of the new, adjusted blue through focus curve peak for the adjusted 440 nm blue center wavelength.

In the CIE color matching functions illustrated in FIG. 6, the difference between the red center wavelength (600 nm) and the blue center wavelength (450 nm) is 600−450=150 nm. In a conventional image sensor spectral response as shown in FIG. 3, the difference between the red center wavelength (620 nm) and the blue center wavelength (470 nm) is 620−470=150 nm. In the improved image sensor spectral response according to the disclosure shown in FIG. 4, the difference between the red center wavelength (610 nm) and the blue center wavelength (440 nm) is 610−440=170 nm. Since the difference between the red and blue center wavelengths is larger, the distance D1'-D3' where the wavelengths are at best focus increases. Therefore the depth of focus, and accordingly, the depth of field, is larger.

According to the disclosure, other improved image sensor spectral responses are possible. The improved image sensor spectral response provides a difference between the red and blue center wavelengths that is larger than 150 nm, which is the difference provided by a typical or conventional image sensor spectral response, and also provided by the CIE color matching functions. The difference can be any difference larger than 150 nm.

Figure 5:
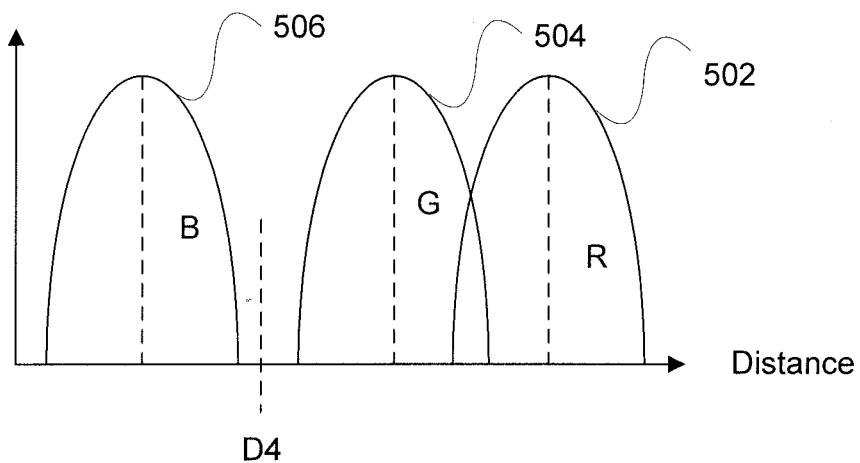
FIG. 5 contains a through focus graph having a red through focus curve, a green through focus curve, and a blue through focus curve.

One caveat is that the difference between the red and blue center wavelengths should not be so large that there is a separation among the three through focus curves of FIG. 2 that would leave a portion of the focal range, and thus a corresponding range of object distances, uncovered. That is, it is important to ensure that there is not a distance at which none of the three colors would be sharply focused. To illustrate this situation, FIG. 5 contains a through focus graph 500 having a red through focus curve 502, a green through focus curve 504, and a blue through focus curve 506. In this example illustrated in FIG. 5, if an object is positioned so as to focus at a distance D4, which is not covered by any of the through focus curves, all color image components of the object would be blurred, and the digital image processor could not restore the blurred images, since there would be no sharp image as a reference. Thus, any position in a domain spanned from the peak of the blue through focus curve to the peak of the red through focus curve should be covered by at least one through focus curve, as shown in FIG. 2, for example.

Figure 7:
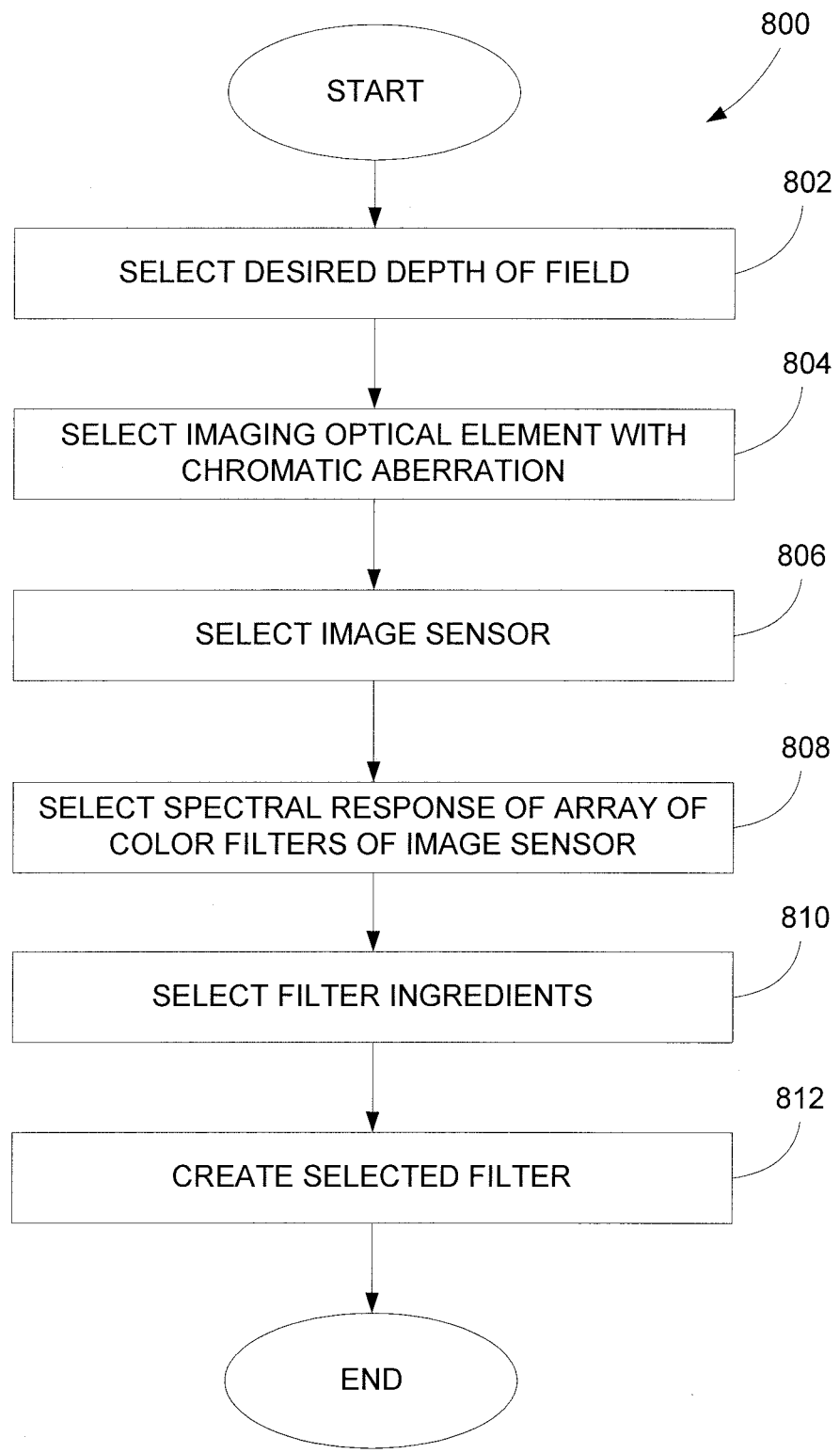
FIG. 7 is a schematic logical flow diagram which illustrates steps in the process of obtaining a desired imaging system depth of field, according to exemplary embodiments.

Hence, according to the disclosure, an imaging system that has a depth of field that is larger than that of typical or conventional systems is obtained by selecting the filters of the color image sensor of the imaging system. The filters or filter ingredients are selected based on a desired depth of focus that corresponds to the desired depth of field. FIG. 7 is a schematic logical flow diagram which illustrates steps in a process 800 of the disclosure, according to some embodiments. Referring to FIG. 7, a desired depth of field for the imaging system is selected in step 802. Next, in step 804, an imaging optical element, e.g., lens, with chromatic aberration is selected for the system. Next, in step 806, an image sensor for the system is selected. Next, in step 808, a spectral response of an array of color filters of the image sensor is selected. Next, in step 810, the filter and/or filter ingredients, i.e., pigments and/or dyes, are selected to obtain the filter spectral response associated with a depth of focus that corresponds to the desired depth of field. Next, in step 812, the selected filter is created or obtained to achieve the desired filter spectral response and, therefore, the desired depth of field for the system.

Combinations of Features

Various features of the present disclosure have been described above in detail. This disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, a difference between the selected first center wavelength and the selected third center wavelength can be greater than 150 nm.

In any of the embodiments described in detail and/or claimed herein, a digital image processor can process detected images of the selected first, selected second and selected third center wavelengths, restoring the images of the selected first, selected second and selected third center wavelengths, and producing sharp images of the selected first, selected second, and selected third center wavelengths.

In any of the embodiments described in detail and/or claimed herein, the color image sensor can comprise a color filter array, and the selected spectral response can be created by a selection of a composition of at least one material of the color filter array.

In any of the embodiments described in detail and/or claimed herein, at least one material whose composition is selected can comprise at least one of a pigment and a dye of the color filter array.

In any of the embodiments described in detail and/or claimed herein, the selected first center wavelength can be 610 nm, the selected second center wavelength can be 550 nm, and the selected third center wavelength can be 440 nm.

In any of the embodiments described in detail and/or claimed herein, the difference between the first and third center wavelengths can be greater than 160 nm.

In any of the embodiments described in detail and/or claimed herein, a difference between the first and third center wavelengths can be greater than or equal to 170 nm.

While the present disclosure has shown and described exemplary embodiments, it will be understood by those of ordinary skill in the art that various changes in form and details may be made therein without departing from the spirit and scope of the present disclosure, as defined by the following claims.

We claim:

1. An imaging system having a selected depth of field, comprising:
   an imaging lens for forming images of an object, the imaging lens having chromatic aberration; and
   a color image sensor for receiving the images of the object, the color image sensor having a selected spectral response, wherein the selected spectral response of the color image sensor is a combined response of a color filter sensitivity and a sensor sensitivity of the color image sensor, wherein the selected spectral response, for each pixel of the color image sensor, is spectral response of electrical signals produced by the pixel from intensity of light at the pixel, and wherein the spectral response of the electrical signals is a function of wavelength of the light, the selected spectral response of the color image sensor defining a selected first center wavelength, a selected second center wavelength and a selected third center wavelength, wherein the selected first center wavelength is larger than the selected second center wavelength and the selected second center wavelength is larger than the selected third center wavelength, the selected first center wavelength and the selected third center wavelength cooperatively defining the depth of field of the imaging system;

wherein the selected spectral response of the color image sensor has a first response, a second response, and a third response, wherein the first response and the second response have overlapping wavelength area to cover a first wavelength, and the second response and the third response have overlapping wavelength area to cover a second wavelength, wherein the first response is a spectral response of a first type of pixel of the color image sensor corresponding to a first color filter, the second response is a spectral response of a second type of pixel of the color image sensor corresponding to a second color filter, and the third response is a spectral response of a third type of pixel of the color image sensor corresponding to a third color filter, wherein center wavelength of the first color filter is the selected first center wavelength, center wavelength of the second color filter is the selected second center wavelength, and center wavelength of the third color filter is the selected third center wavelength, and wherein difference between the selected first center wavelength and the selected second center wavelength is greater than 150 nm.

2. The imaging system of claim 1, further comprising a digital image processor for processing detected images of the selected first, selected second and selected third center wavelengths, restoring the images of the selected first, selected second and selected third center wavelengths, and producing sharp images of the selected first, selected second, and selected third center wavelengths.

3. The imaging system of claim 1, wherein the color image sensor comprises a color filter array, the selected spectral response being created by selection of a composition of at least one material of the color filter array.

4. The imaging system of claim 3, wherein the at least one material comprises at least one of a pigment and a dye of the color filter array.

5. The imaging system of claim 1, wherein the selected first center wavelength is 610 nm, the selected second center wavelength is 550 nm, and the selected third center wavelength is 440 nm.

6. A method of controlling depth of field in an imaging system, comprising:
providing an imaging lens with chromatic aberration for forming images of an object; and
receiving the images of the object at a color image sensor, the color image sensor having a selected spectral response, wherein the selected spectral response of the color image sensor is a combined response of a color filter sensitivity and a sensor sensitivity of the color image sensor, wherein the selected spectral response, for each pixel of the color image sensor, is spectral response of electrical signals produced by the pixel from intensity of light at the pixel, and wherein the spectral response of the electrical signals is a function of wavelength of the light, the selected spectral response defining a selected first center wavelength, a selected second center wavelength and a selected third center wavelength, wherein the selected first center wavelength is larger than the selected second center wavelength and the selected second center wavelength is larger than the selected third center wavelength, the selected first center wavelength and the selected third center wavelength cooperatively defining a selected depth of field of the imaging system;
wherein the selected spectral response of the color image sensor has a first response, a second response, and a third response, wherein the first response and the second response have overlapping wavelength area to cover a first wavelength, and the second response and the third response have overlapping wavelength area to cover a second wavelength, wherein the first response is a spectral response of a first type of pixel of the color image sensor corresponding to a first color filter, the second response is a spectral response of a second type of pixel of the color image sensor corresponding to a second color filter, and the third response is a spectral response of a third type of pixel of the color image sensor corresponding to a third color filter, wherein center wavelength of the first color filter is the selected first center wavelength, center wavelength of the second color filter is the selected second center wavelength, and center wavelength of the third color filter is the selected third center wavelength, and wherein difference between the selected first center wavelength and the selected second center wavelength is greater than 150 nm.

7. The method of claim 6, further comprising processing detected images of the selected first, selected second and selected third center wavelengths, restoring the images of the selected first, selected second and selected third center wavelengths, and producing sharp images of the selected first, selected second, and selected third center wavelengths.

8. The method of claim 6, wherein the color image sensor comprises a color filter array, the selected spectral response of the color image sensor being based on selection of a composition of at least one material of the color filter array.

9. The method of claim 8, wherein the at least one material comprises at least one of a pigment and a dye of the color filter array.

10. The method of claim 6, wherein the selected first center wavelength is 610 nm, the selected second center wavelength is 550 nm, and the selected third center wavelength is 440 nm.

11. An imaging system, comprising:
an imaging lens having chromatic aberration for forming color images of an object;
a color image sensor having a selected spectral response for detecting images of a first center wavelength, a second center wavelength, and a third center wavelength of the object formed by the imaging lens;
wherein the selected spectral response of the color image sensor is a combined response of a color filter sensitivity and a sensor sensitivity of the color image sensor, wherein the selected spectral response, for each pixel of the color image sensor, is spectral response of electrical signals produced by the pixel from intensity of light at the pixel, and wherein the spectral response of the electrical signals is a function of wavelength of the light;
wherein the spectral response of the color image sensor determines the first, second, and third center wavelengths, the first center wavelength is larger than the second center wavelength and the second center wavelength is larger than the third center wavelength, the selected first center wavelength and the selected third center wavelength cooperatively defining the depth of field of the imaging system;
wherein the selected spectral response of the color image sensor has a first response, a second response, and a third response, wherein the first response and the second response have overlapping wavelength area to cover a first wavelength, and the second response and the third response have overlapping wavelength area to cover a second wavelength, wherein the first response is a spectral response of a first type of pixel of the color image sensor corresponding to a first color filter, the second response is a spectral response of a second type of pixel of the color image sensor corresponding to a second color filter, and the third response is a spectral response of a third type of pixel of the color image sensor corresponding to a third color filter,
wherein center wavelength of the first color filter is the selected first center wavelength, center wavelength of the second color filter is the selected second center wavelength, and center wavelength of the third color filter is the selected third center wavelength, and wherein difference between the selected first center wavelength and the selected second center wavelength is greater than 150 nm;
wherein the imaging system has a first through focus curve having a first peak of the first center wavelength, a second through focus curve having a second peak of the second center wavelength, and a third through focus curve having a third peak of the third center wavelength, and wherein at least one of the through focus curves covers any position in a domain spanned from the first peak to the third peak;
and a digital image processor that processes the detected images of the first, second, and third center wavelengths, restores the images of the first, second, and third center wavelengths, and produces sharp images of the first, second, and third center wavelengths.

12. The imaging system of claim 11, wherein a difference between the first and third center wavelengths is greater than 160 nm.

13. The imaging system of claim 11, wherein a difference between the first and third center wavelengths is greater than or equal to 170 nm.

14. The imaging system of claim 11, wherein the first center wavelength is 610 nm, the second center wavelength is 550 nm, and the third center wavelength is 440 nm.

15. The imaging system of claim 11, wherein the first, second, and third center wavelengths are within the visible light spectrum.

16. The imaging system of claim 11, wherein the color image sensor comprises color filters, the selected spectral response of the color image sensor being based on selection of a composition of at least one material of the color filters.

\* \* \* \* \*